(12) United States Patent
Piaulet et al.

(10) Patent No.: US 10,132,608 B2
(45) Date of Patent: Nov. 20, 2018

(54) METHOD FOR CALIBRATING AN ACTUATING DEVICE

(71) Applicant: PGA ELECTRONIC, Montierchaume (FR)

(72) Inventors: Jean-Francois Piaulet, Deols (FR); Sebastien Bizien, Deols (FR); Alain Berthouloux, Chateauroux (FR)

(73) Assignee: PGA ELECTRONIC, Montierchaume (FR)

( * ) Notice: Subject to any disclaimer, the term of this patent is extended or adjusted under 35 U.S.C. 154(b) by 212 days.

(21) Appl. No.: 14/413,699

(22) PCT Filed: Jul. 9, 2013

(86) PCT No.: PCT/EP2013/064463
§ 371 (c)(1),
(2) Date: Jan. 8, 2015

(87) PCT Pub. No.: WO2014/009356
PCT Pub. Date: Jan. 16, 2014

(65) Prior Publication Data
US 2015/0137790 A1    May 21, 2015

(30) Foreign Application Priority Data
Jul. 9, 2012   (FR) ..................... 12 56580

(51) Int. Cl.
*G01B 7/00* (2006.01)
*B60N 2/02* (2006.01)
(Continued)

(52) U.S. Cl.
CPC .............. *G01B 7/003* (2013.01); *B60N 2/02* (2013.01); *B60N 2/20* (2013.01); *B60N 2/23* (2013.01);
(Continued)

(58) Field of Classification Search
CPC ... B64D 11/06; B64D 11/064; B64D 11/0641; G01B 7/003; B60N 2/442; B60N 2/20;
(Continued)

(56) References Cited

U.S. PATENT DOCUMENTS 4,401,928 A * 8/1983 Kamijo ................ B60N 2/0228
                                                        318/466
5,074,053 A * 12/1991 West ...................... G01B 7/003
                                                        324/207.24
(Continued)

FOREIGN PATENT DOCUMENTS

| EP | 1 103 412 A1 | 5/2001 |
|---|---|---|
| EP | 1 298 508 A1 | 4/2003 |
| FR | 2 736 879 A1 | 1/1997 |

OTHER PUBLICATIONS

International Search Report and Written Opinion for PCT Application No. PCT/EP2013/064463 dated Oct. 7, 2013.
(Continued)

*Primary Examiner* — Son Le
*Assistant Examiner* — Dustin Dickinson
(74) *Attorney, Agent, or Firm* — Pearne & Gordon LLP

(57) ABSTRACT

A method for calibrating a device for actuating one or several elements to be actuated of a structure, with the actuating device comprising one or several actuators, characterised in that it comprises the following successive steps: (b1) placing the structure, in particular the element or elements to be actuated of the structure, in a predetermined reference position,
(b2) activating a calculation unit to automatically calibrate the actuator or actuators of the actuating device, with the calculation unit able to determine, for the actuator or actuators, the minimum and maximum end stops that define its or
(Continued)

their authorised range of movement using the predetermined reference position of the structure, taken as the origin position.

9 Claims, 2 Drawing Sheets

(51) Int. Cl.
  *B60N 2/20* (2006.01)
  *B60N 2/23* (2006.01)
  *B60N 2/90* (2018.01)
(52) U.S. Cl.
  CPC ............. *B60N 2/231* (2013.01); *B60N 2/233* (2013.01); *B60N 2/919* (2018.02); *B60N 2/995* (2018.02)
(58) Field of Classification Search
  CPC ...... B60N 2/4495; B60N 2/02; B60N 2/0248; B60N 2/0268; B60N 2/0272; B60N 2/23; B60N 2/231; B60N 2/233
  See application file for complete search history.

(56) References Cited

U.S. PATENT DOCUMENTS

| | | | |
|---|---|---|---|
| 6,351,117 B1* | 2/2002 | Ehling | G01B 7/003 324/207.12 |
| 8,954,239 B2 | 2/2015 | Piaulet et al. | |
| 2005/0088025 A1* | 4/2005 | Christopher | B60N 2/02 297/362.13 |
| 2008/0255788 A1 | 10/2008 | Muhammad et al. | |
| 2011/0025113 A1* | 2/2011 | Thoreux | B60N 2/0244 297/330 |
| 2012/0173089 A1* | 7/2012 | Maeda | B60N 2/0248 701/49 |

OTHER PUBLICATIONS

French Search Report for France Application No. 1256580 dated May 8, 2013. (Cited references are in English).

* cited by examiner

METHOD FOR CALIBRATING AN ACTUATING DEVICE

CROSS-REFERENCE TO RELATED PATENT APPLICATIONS

The present application is a National Stage Application of International Application No. PCT/EP2013/064463 entitled "METHOD FOR CALIBRATING AN ACTUATING DEVICE" filed Jul. 9, 2013, which claims priority to France Patent Application No. 12 56580 filed Jul. 9, 2012, the contents of which are incorporated herein by reference in their entirety.

TECHNICAL FIELD

This invention relates to the field of devices for actuating elements to be actuated, in particular seat elements. It relates more specifically to a method for calibrating a device for actuating one or several elements to be actuated, in particular one or several seat elements.

PRIOR ART

In order to be able to modify the position of a user installed on a seat according to his desires or imposed circumstances, it is known to provide the seats with electrical actuating devices that make it possible to vary the configurations of the seat by displacing movable seat elements. Such seats can be found for example in transport vehicles such as aircraft, boats and railway cars.

Patent applications US 2008/255788 A1, EP 1 103 412 A1 and EP 1 298 508 A1 show, among others, prior art with respect to this subject.

A seat can for example comprise seat elements such as an inclinable seatback articulated at an end of a seat portion and a leg rest articulated at the other end of the seat portion. The configuration of each seat element can be modified by the intermediary of an actuating device that is able to control, independently or simultaneously, the displacement of actuators placed on the seat elements.

Moreover, in order to know at each instant the position of the actuators, and therefore the position of the seat elements, it is known to provide in association with the actuators transducers such as potentiometers that make it possible to collect measurement values that represent absolute positions of the actuators.

Before the seat is used, it is necessary to calibrate each actuator, in particular through the potentiometer provided on the actuator, in such a way that the actuating device is able to control the displacement of each actuator in its authorised range of movement (between its minimum end stop and its maximum end stop, with the latter resulting from the mechanical or imposed limits), in order to allow for a change in the configuration of each seat element.

In order to proceed with calibrating the actuators of the actuating device, it is known to manually displace each seat element between its two end positions and to read the two corresponding values by the potentiometer in order to carry out the calibration.

Methods for calibrating actuators are also known wherein the calibrating of the actuators is carried out before the mounting of the actuators in their environment on the seat, and this mounting of the actuators on the seat is carried out systematically by placing the seat beforehand in a predefined position.

The existing solutions of prior art are not entirely satisfactory. On the one hand, it can be meticulous and take an excessive amount of time to carry out a manual calibration for each actuator by displacement to its end positions. On the other hand, it can be restrictive and uncomfortable to have to carry out the mounting of the actuating device in its environment on the seat when the seat is in a single and unique predetermined position.

DESCRIPTION OF THE INVENTION

There is a need to have a new method for calibrating an actuating device that allows for a more comfortable and faster calibration of the actuators. There is also a need in order to allow for such a calibration independently of the position of the structure, in particular a seat, receiving the actuators during the mounting of the actuators.

The invention aims to satisfy all or a portion of these needs.

The invention as such has for object, according to one of its aspects, a method of calibrating an actuating device of one or several elements to be actuated of a structure, with the actuating device comprising one or several actuators, characterised in that it comprises the following successive steps:

(b1) placing the structure, in particular the element or elements to be actuated of the structure, in a predetermined reference position, (b2) activating a calculation unit to automatically calibrate of the actuator or actuators of the actuating device, with the calculation unit able to determine, for the actuator or actuators, the minimum and maximum end stops that define its or their authorised range of movement from the predetermined reference position of the structure, taken as the origin position.

Thanks to the invention, it can be possible to quickly and effectively calibrate the actuator or actuators of an actuating device, by simply placing the structure in a predetermined reference position and triggering an automatic calibration in order to determine the minimum and maximum end stops of the actuators. The mounting of the actuators on the structure before its kinematic use can be facilitated as it can be possible to overcome the position of the structure during the mounting. Indeed, the actuating device can be installed on the structure, with the latter being in any configuration, and the sole knowledge of a predetermined reference position of the structure can allow for the calibrating of the actuator or actuators using the calculation unit.

The method according to the invention can further comprise one or several of the following characteristics taken individually or in any technical permissible combination.

The element or elements to be actuated can more preferably be seat elements. Likewise, the structure can preferably be a seat, in particular a seat of a transport vehicle, for example a seat of an aircraft, boat or a railway car.

The predetermined reference position of the structure can be chosen in different ways. It can for example correspond to a conventional configuration for use (or final position) of the structure, in particular the takeoff position for an aircraft seat. It can also correspond to a position of the structure wherein at least one portion of the actuators of the actuating device is in mechanical end stop, i.e. the actuator or actuators are positioned on their minimum mechanical end stop or on their maximum mechanical end stop.

The structure can be placed in a single and unique predetermined reference position. In particular, calibrating all of the actuators of the actuating device can be done solely using this single and unique predetermined reference position of the structure. In other words, it is possible to not need to place the structure in one or several other reference positions than said predetermined reference position in order to carry out the calibration of the actuating device.

The step b1 can be preceded by a step a1 consisting in mounting the actuating device, and in particular the actuator or actuators, on the structure, although the structure is in any position before mounting. In this way, the invention can make it possible to overcome a predefined positioning of the structure during the mounting of the actuating device onto the latter. The mounting of the actuator or actuators in their environment can as such be faster and easier.

The step b1 can be preceded by a step a2 of initialising the copying of the position consisting in mechanically displacing one or several actuators over the entire range or ranges of movement required to reach each minimum mechanical end stop and each maximum mechanical end stop of the structure, with each actuator being associated with a transducer suited to provide a measurement value that represents the absolute position of the actuator, with the displacement of each actuator accompanied by a movement of friction on the transducer when a mechanical end stop of the actuator is reached in order to allow the transducer to provide a measurement value over the entire range of movement of the actuator.

The step of initialising the copying of the position can make it possible to verify the positioning of the structure with respect to the mechanical course of the actuator or actuators. In this way, any dispersion of the mechanical end stops of the structure can be corrected by a manual adjustment in order to overcome the mechanical disparities to be corrected.

More preferably, the transducer is a potentiometer.

The step of initialising the copying of the position can correspond to a step of initialising the operation of each transducer.

An operator can manually displace each actuator, with the latter in particular already located in place on the structure, over its entire mechanical range of movement and act on each transducer via friction in order to ensure that each actuator can be displaced alternately to its minimum and maximum mechanical end stops while still allowing the transducer to provide a corresponding measurement value. In other words, the step a2 can make it possible, where applicable, to displace the minimum end stop and/or the maximum end stop of the transducer in order to "realign" it with the minimum end stop and/or maximum end stop corresponding to the actuator.

The copying of the friction position can make it possible to guard against damaging the transducer, which can occur when the actuator is mechanically displaced beyond a minimum or maximum end sop of the transducer. As the actuator is mounted on the structure independently of the positioning of the elements to be actuated, this risk can appear on any location of the course of the actuator.

More preferably, the step a2 of initialising the copy of the position is carried out after the step a1 and before the step b1.

The step a2 can be optional, in particular when the operation of each transducer is already suited to the range of movement of the actuator to which it is associated, i.e. when each transducer is already able to provide a measurement value that represents the absolute position of the actuator over its entire range of movement, and this in particular before mounting the actuator onto the structure.

The calculation unit can be able to determine the minimum and maximum end stops of each actuator using a calculation algorithm that applies positive and/or negative increments using the origin position of the actuator defined by the predetermined reference position of the structure.

More particularly, for a given actuator, the calculation unit can be able to define its origin position O, corresponding to the position of the actuator when the structure is in the predetermined reference position, and to apply to this origin position O positive $I^+$ increments and/or negative increments $I^-$ making it possible to obtain corresponding positions $O+I^+$ and/or $O-I^-$ of the actuator until two of these corresponding positions make it possible respectively to obtain the minimum and maximum end stops of the actuator. In this way, the actuator can then be considered as calibrated.

The theoretical knowledge of the range of movement of each actuator can be used for the application of the positive and/or negative increments.

The step b2 can be followed by an optional step c1 that consists in checking the proper operation of the actuator or actuators in place on the structure after automatic calibration during the step b2.

The step b2 can in particular make it possible to check that the various configurations for use of the structure are correctly obtained when the actuators are displaced. The course of displacement of an actuator in order to obtain a specific configuration for use of the element to be actuated to which it is associated can be determined for example using a database provided for this purpose.

The step b2 can furthermore be followed if necessary, more preferably after the step c1, by a step c2 of manual calibration consisting in placing an actuator to be recalibrated in a substantially median position of its range of movement and in activating the calculation unit for the manual calibrating of the actuator, with the calculation unit being able to memorise the end stop or stops of the actuator after displacement of the actuator on this or these end stops.

The step c2 can allow for a manual adjustment of the calibration of an actuator in case of non-optimal automatic calibration during the step b2, in order to offset for mechanical disparities and/or during the replacing of a defective actuator on the structure in order to not have to recalibrate all of the actuators.

BRIEF DESCRIPTION OF THE DRAWINGS

The invention can be better understood by reading the following detailed description of a non-restricted embodiment of the latter, as well as by examining the diagrammatical and partial figures of the annexed drawing, wherein.

DETAILED DESCRIPTION OF A PARTICULAR EMBODIMENT

FIGS. 1, 2 and 3a to 3c show an example embodiment of the method according to the invention.

Figure 1:
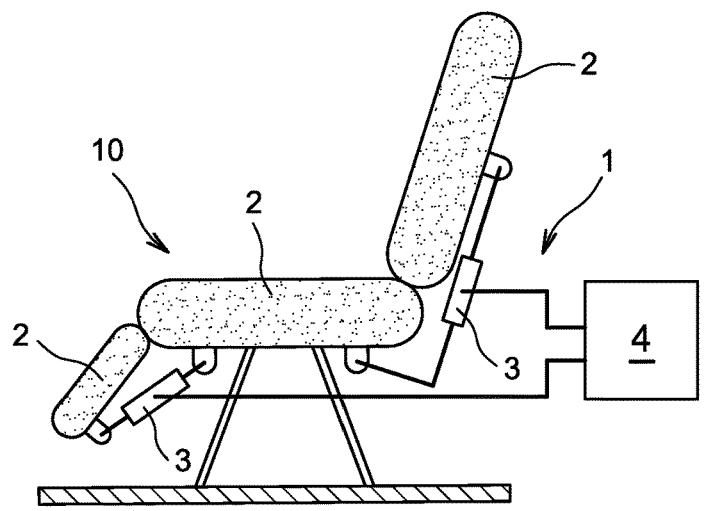
FIG. 1 shows an example of a structure in the form of a seat provided with an actuating device.

In reference to FIG. 1, an example of the structure 10 is shown in the form of a seat, for example an aircraft seat, comprising three elements to be actuated 2 in the form of seat elements.

The seat elements 2 correspond for example to an inclinable seatback, a seat portion and a leg rest.

The seat elements 2 of the seat 10 can be displaced in order to modify the configuration for use of the seat 10 by means of an actuating device 1 that comprises actuators 3.

The automatic calibrating of the actuators 3 can be carried out using a calculation unit 4 to which the actuators 3 are connected.

Figure 2:
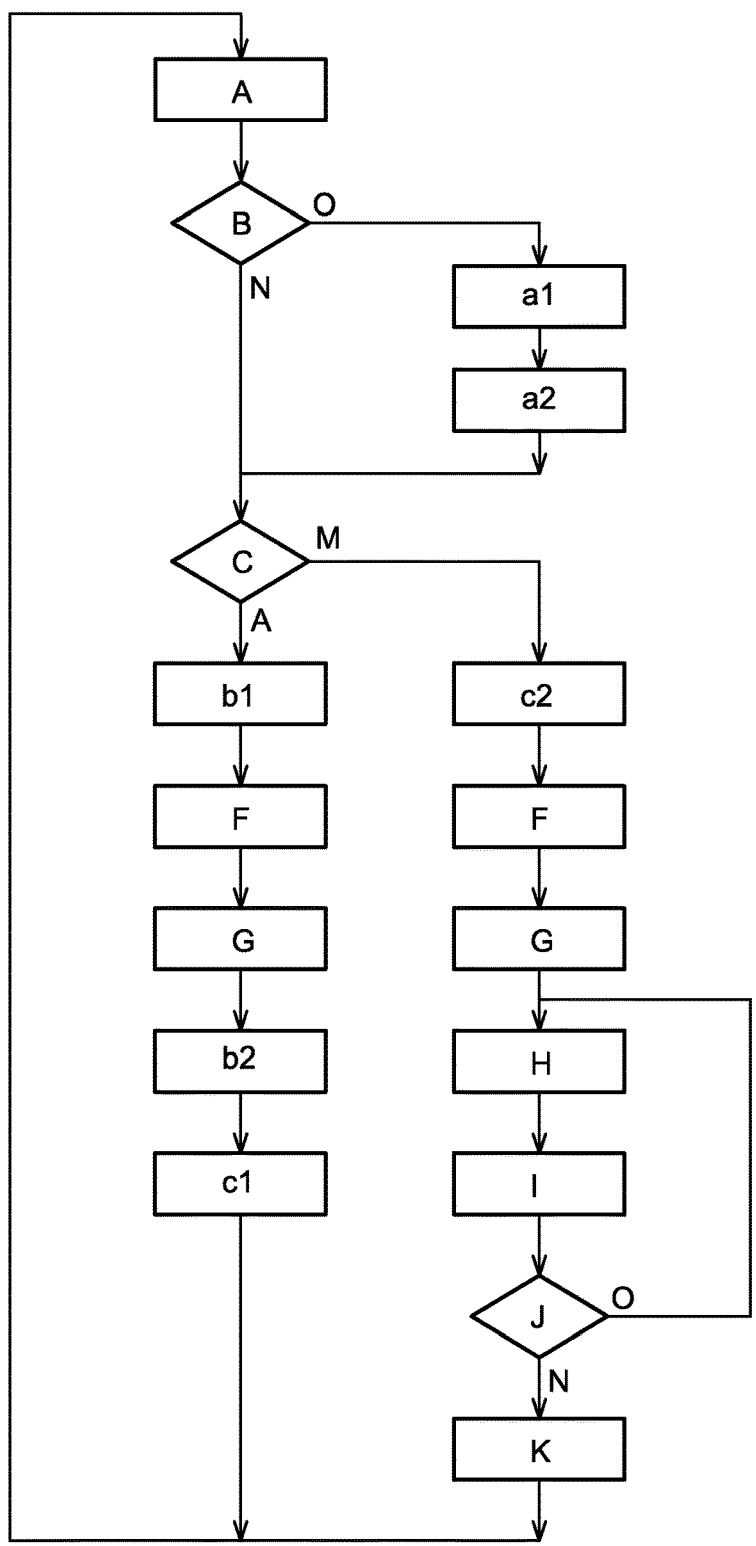
FIG. 2 shows a diagram showing an embodiment of steps of the method according to the invention.

FIG. 2 shows a diagram showing the steps of the method according to the invention, for example implemented on the seat 10 of FIG. 1.

In accordance with the invention, the method comprises at least the steps b1 and b2 shown in FIG. 2, consisting respectively in placing the seat 10, in particular the seat elements 2, in a predetermined reference position, in particular the takeoff position of the seat 10, and in activating the calculation unit 4 for the automatic calibrating of the actuators 3 of the actuating device 1.

The calculation unit 4 is able to determine, for the actuators 3, the minimum and maximum end stops that define their authorised range of movement using the predetermined reference position of the seat 10, taken as the origin position.

More precisely, for a given actuator 3, the calculation unit 4 is able to define its origin position O, corresponding to the position of the actuator 3 when the seat 10 is in the predetermined reference position, and in applying to this origin position O positive increments $I^+$ and/or negative increments $I^-$ making it possible to obtain corresponding positions O+I+ and/or O−I− of the actuator 3 until two of these corresponding positions make it possible respectively to obtain the minimum and maximum end stops of the actuator 3.

The minimum end stop of the actuator 3 is therefore given by a corresponding position $O+I^-_{min}$ and the maximum end stop of the actuator 3 is given by a corresponding position $O+I^+_{max}$.

The method can for example be implemented in the following way.

The calculation unit 4 is first of all turned off in a step A before proceeding with calibrating the actuating device 1.

During the B, the operator must determine if the method of calibration concerns the initial calibrations of an actuating device 1 intended to be mounted for the first time on a seat 10 or the calibration of a new actuator 3 intended to be mounted on the seat 10 as a replacement for a defective actuator 3. In these two cases (case O), the method successively comprises the steps a1 and a2. In the opposite case (case N), i.e. no initial calibrating of the actuating device 1 or replacing of an actuator 3, the method immediately comprises the step C following the step B.

The step a1 allows for the mounting of the actuating device 1 on the seat 10, with the seat 10 being in any position before this mounting, and this before even carrying out the calibrating of any actuator 3.

Once the installation of the actuating device 1 has been completed on the seat 10, the step a2 allows an operator to manually displace at least one actuator 3, in particular all of the actuators 3 for an initial calibrating or a replacement actuator 3, over its entire range of movement, with the displacement accompanied by a movement of friction on a transducer associated with the actuator 3, and this in order to allow for a copying of the friction position in relation to the complete movement of the actuator 3 in its range of movement.

To do this, the operator can for example use the manual clutch control of the actuator 3 in order to test if the latter is able to move correctly over its entire course, namely until each of the mechanical end stops.

Figure 3A:
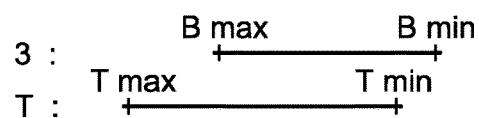
FIGS. 3a to 3c show the principle of the step a2 of initialising the copy of the position.
Figure 3B:
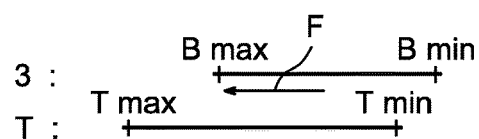
Figure 3C:
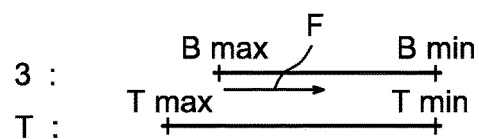

FIGS. 3a to 3c show more precisely the principle of the step a2 of copying the position on a particular example.

Initially, after the mounting of the actuator 3 on the seat 10, it is possible for example, as shown in FIG. 3a, that the course of the actuator 3, i.e. its range of movement defined by the minimum $B_{min}$ and maximum $B_{max}$ end stops, does not correspond to the measurement range of the transducer T defined by the minimum $T_{min}$ and maximum $T_{max}$ end stops of the transducer T. More particularly on this example, the transducer T cannot allow for the measurement of the minimum $B_{min}$ end stop of the actuator 3, the transducer T risks becoming damaged, although the problem does not arise for the reading of the maximum $B_{max}$ end stop of the actuator 3.

FIG. 3b shows the fact that the displacement of the actuator 3 (according to the arrow F) to its maximum $B_{max}$ end stop does not give rise to a problem in relation to transducer T in order to allow for the measurement of this maximum $B_{max}$ end stop because the maximum $T_{max}$ end stop of the transducer T is located beyond the maximum $B_{max}$ end stop of the actuator 3.

On the other hand, when the actuator 3 is displaced to its minimum $B_{min}$ end point (according to the arrow F in FIG. 3c), the transducer T is not able to allow it to be measured due to the lower minimum $T_{min}$ end stop. Also, as is shown in FIG. 3c, the minimum $T_{min}$ end stop of the transducer T is displaced in order to be in concordance with the minimum $B_{min}$ end stop of the actuator 3 via a friction movement.

At the end of the step a2, the method according to the invention then comprises the step C during which the operator has to determine if this will entail a manual calibrating M or an automatic calibrating A of the actuating device 1, with automatic calibrating A being implemented systematically during the method according to the invention in a first step. It may or may not be followed by manual calibrating M.

The first step b1 of the automatic calibrating A consists in placing the seat 10 in the predetermined reference position.

This predetermined reference position is defined beforehand and can for example correspond to a precise configuration for use of the seat 10 for a user or to a configuration wherein actuators 3 are positioned on one of their mechanical end stops.

During the step b1, it is possible to turn on the calculation unit 4 in order to possibly position the seat 10 in the predetermined reference position using the electronic means connected to the control unit 4. However, the calculation unit 4 is again turned off before starting the step F.

The steps F and G respectively make it possible to turn on the calculation unit 4 and to act on the calculation unit 4 in order to place it in calibration mode.

During the step b2, the activation of the automatic calibrating mode of the calculation unit 4 then makes it possible, by means of the calculation algorithm, to determine the minimum and maximum end stops of the actuators 3 by application of positive and/or negative increments using the known predetermined reference position. The calculation unit 4 is able to memorise all of the calculated end stops of the actuators 3.

Finally, during the step c1, the operator checks for the proper operation of the actuators 3 in place on the seat 10 in order to determine if a manual calibrating method M is required to correct one or several end stops of one or several actuators which may have shifted.

For the case where the verification of the operation of the actuators 3 during the step c1 gives a satisfactory result, the method ends with the step c1.

In the opposite case where a manual calibrating M of at least one actuator 3 is required, the method return to the step A during which the calculation unit 4 is again turned off, then the steps B and C lead directly to the step c2.

During the step c2, at least one actuator 3 that has to be recalibrated is placed at approximately half of its course.

To do this, the operator can for example use the manual clutch control of the actuator 3 in order displace the actuator 3 over its entire range of movement and the actuator 3 is then placed in a median position of its range of movement.

The steps F and G respectively make it possible to turn on the calculation unit 4 and to act on the calculation unit 4 in order to place it in calibration mode.

During the step H, the operator displaces the actuator 3 to a new desired end stop. The displacement of the actuator 3 can be carried out mechanically by clutch or electrically using the calculation unit 4.

The step I allows the operator to validate on the calculation unit 4 the placing of the actuator 3 on this new end stop. In order to allow for a visual inspection of the proper taking into account of this new end stop, the actuator 3 is displaced in the direction opposite the end stop that is again calibrated by carrying out a brief movement in order to return and be placed on this newly calibrated end stop.

The step J allows the operator to determine if another end stop of the actuator has to be calibrated. If such is the case, the step J leads again to the step H. Otherwise, the step J leads to the step K which consists for the operator in exiting the calibration mode of the calculation unit 4.

At the end of these steps, the actuating device 1 is entirely calibrated using the knowledge of a single predetermined reference position and without having had to position the seat 10 in a predefined configuration.

The invention can therefore make it possible to incorporate the actuating device 1 onto the seat 10, regardless of the position of the seat 10, and the automatic calibrating of the actuators 3 already in place on the seat 10.

Of course, the invention is not limited to the example embodiment which has just been described.

The expression "comprising a" must be understood as being synonymous with "comprising at least one", unless specified otherwise.

The invention claimed is:

1. A method for calibrating an actuating device that actuates an element of a structure, the actuating device comprising an actuator, the method comprises:
   (a1) mounting the actuating device onto the structure, while the structure is in any positon between a minimum structure mechanical end stop and a maximum structure mechanical end stop,
   (a2) performing an initial calibration of the actuator by:
      mechanically displacing the actuator over a range of movement required to reach the minimum and maximum structure mechanical end stops, with the actuator being associated with a transducer that provides a measurement value which represents an absolute position of the actuator, with the displacement of the actuator accompanied by a movement of friction on the transducer when the minimum and maximum structure mechanical end stops are reached in order to allow the transducer to provide a first measurement value at the minimum structure mechanical end stop and a second measurement value at the maximum structure mechanical end stop and measurement values over the range of movement of the actuator,
      determining if the range of movement of the actuator is within a range of measurement values of the transducer defined between the first and second measurement values, and
      adjusting the positon of the actuator on the structure such that the range of movement of the actuator is within the range of measurement values of the transducer if it is determined that the range of movement of the actuator is not within the range of measurement values of the transducer,
   (b1) placing the structure, and the element of the structure to be actuated, in a predetermined reference position,
   (b2) activating a calculation unit to automatically calibrate the actuator of the actuating device, with the calculation unit able to determine, a minimum actuator mechanical end stop and a maximum actuator mechanical end stop that defines its authorised range of movement using the predetermined reference position of the structure, taken as an origin position, said automatic calibration including incremental positive and/or negative movement of the actuator between the minimum and maximum actuator mechanical end stops.

2. The method of claim 1, wherein the transducer is a potentiometer.

3. The method of claim 1, wherein the calculation unit is able to determine the minimum and maximum actuator mechanical end stops by means of a calculation algorithm that applies positive and/or negative increments using the origin position of the actuator defined by the predetermined reference position of the structure.

4. The method of claim 1, wherein the step (b2) is followed by a step (c1) comprising:
   (c1) checking proper operation of the actuator in place on the structure after automatic calibration during the step (b2).

5. The method of claim 1, wherein the step (b2) is followed by a step (c2) of manual calibrating comprising:
   (c2) placing the actuator in a median position of its range of movement and activating the calculation unit for the manual calibration of the actuator, with the calculation unit able to memorise the minimum actuator mechanical end stop, the maximum actuator mechanical end stop, or both the minimum and maximum actuator mechanical end stops after the displacement of the actuator to said actuator mechanical end stop or stops.

6. The method of claim 1, wherein the predetermined reference position of the structure corresponds to a configuration for use of the structure.

7. The method of claim 1, wherein the structure is an aircraft seat, and wherein the element to be actuated is a seat element.

8. The method of claim 1, wherein the structure is placed in a single and unique predetermined reference position.

9. The method of claim 1, wherein the predetermined reference position can be any position between the minimum structure mechanical end stop and the maximum structure mechanical end stop.

* * * * *